United States Patent
Kore et al.

(10) Patent No.: US 9,412,247 B2
(45) Date of Patent: Aug. 9, 2016

(54) ALARM SYSTEM WITH WIRELESS COMMUNICATION

(71) Applicant: Honeywell International Inc., Morristown, NJ (US)

(72) Inventors: Vinayak Sadashiv Kore, Bangalore (IN); Sunil M. Ingawale, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 96 days.

(21) Appl. No.: 14/226,946

(22) Filed: Mar. 27, 2014

(65) Prior Publication Data

US 2015/0279184 A1   Oct. 1, 2015

(51) Int. Cl.
| | |
|---|---|
| G08B 1/08 | (2006.01) |
| G08B 17/10 | (2006.01) |
| G08B 7/06 | (2006.01) |
| G08B 25/00 | (2006.01) |
| G08B 25/01 | (2006.01) |
| G08B 25/10 | (2006.01) |
| H04W 4/22 | (2009.01) |

(52) U.S. Cl.
CPC .............. *G08B 17/10* (2013.01); *G08B 7/066* (2013.01); *G08B 25/009* (2013.01); *G08B 25/016* (2013.01); *G08B 25/10* (2013.01); *H04W 4/22* (2013.01)

(58) Field of Classification Search
CPC ..................................... G08B 25/016
USPC ................................... 340/539.13
See application file for complete search history.

(56) References Cited

U.S. PATENT DOCUMENTS

| | | | |
|---|---|---|---|
| 5,644,293 A * | 7/1997 | Right | G08B 29/06 340/507 |
| 6,970,183 B1 * | 11/2005 | Monroe | G08B 7/062 348/143 |
| 7,336,168 B2 * | 2/2008 | Kates | G08B 21/0236 340/506 |
| 7,952,476 B1 | 5/2011 | Causey et al. | |
| 2004/0236547 A1 * | 11/2004 | Rappaport | G06F 17/509 703/2 |
| 2008/0186135 A1 * | 8/2008 | Boling | G01S 5/0009 340/7.51 |
| 2008/0303678 A1 * | 12/2008 | McCredy | G08B 17/00 340/628 |
| 2009/0127030 A1 * | 5/2009 | Hikita | B66B 5/024 187/387 |
| 2011/0136463 A1 | 6/2011 | Ebdon et al. | |
| 2011/0206036 A1 * | 8/2011 | DeWeese | H04M 3/5116 370/352 |
| 2014/0062693 A1 * | 3/2014 | Watts | G08B 27/006 340/539.11 |
| 2014/0114780 A1 * | 4/2014 | Menefee | G06Q 20/20 705/21 |
| 2014/0253326 A1 * | 9/2014 | Cho | H04W 4/22 340/539.13 |
| 2015/0071450 A1 * | 3/2015 | Boyden | H04R 27/00 381/58 |

OTHER PUBLICATIONS

Extended European search report from corresponding EP application 15158536.1, dated Jul. 27, 2015.

(Continued)

*Primary Examiner* — Naomi Small
(74) *Attorney, Agent, or Firm* — Husch Blackwell LLP

(57) ABSTRACT

A system is provided, wherein the system includes a fire alarm system within a secured area, a call station of the fire alarm system, and a cellphone that includes at least one fire detection device and that forms a cellular connection with the fire alarm system, wherein the fire alarm system determines a location of the cellphone based upon the cellular connection, and wherein the fire alarm system detects a fire within the secured area and provides instructions through the cellphone for exiting the secured area based upon the detected location of the cellphone.

19 Claims, 1 Drawing Sheet

(56) References Cited

OTHER PUBLICATIONS

Chu, A RFID-Based Hybrid Building Fire Evacuation System on Mobile Phone, 2010 Sixth International Conference on Intelligent Information Hiding and.

Multimedia Signal Processing, IEEE, Oct. 15, 2010, pp. 155-158, Piscataway, NJ, U.S.

* cited by examiner

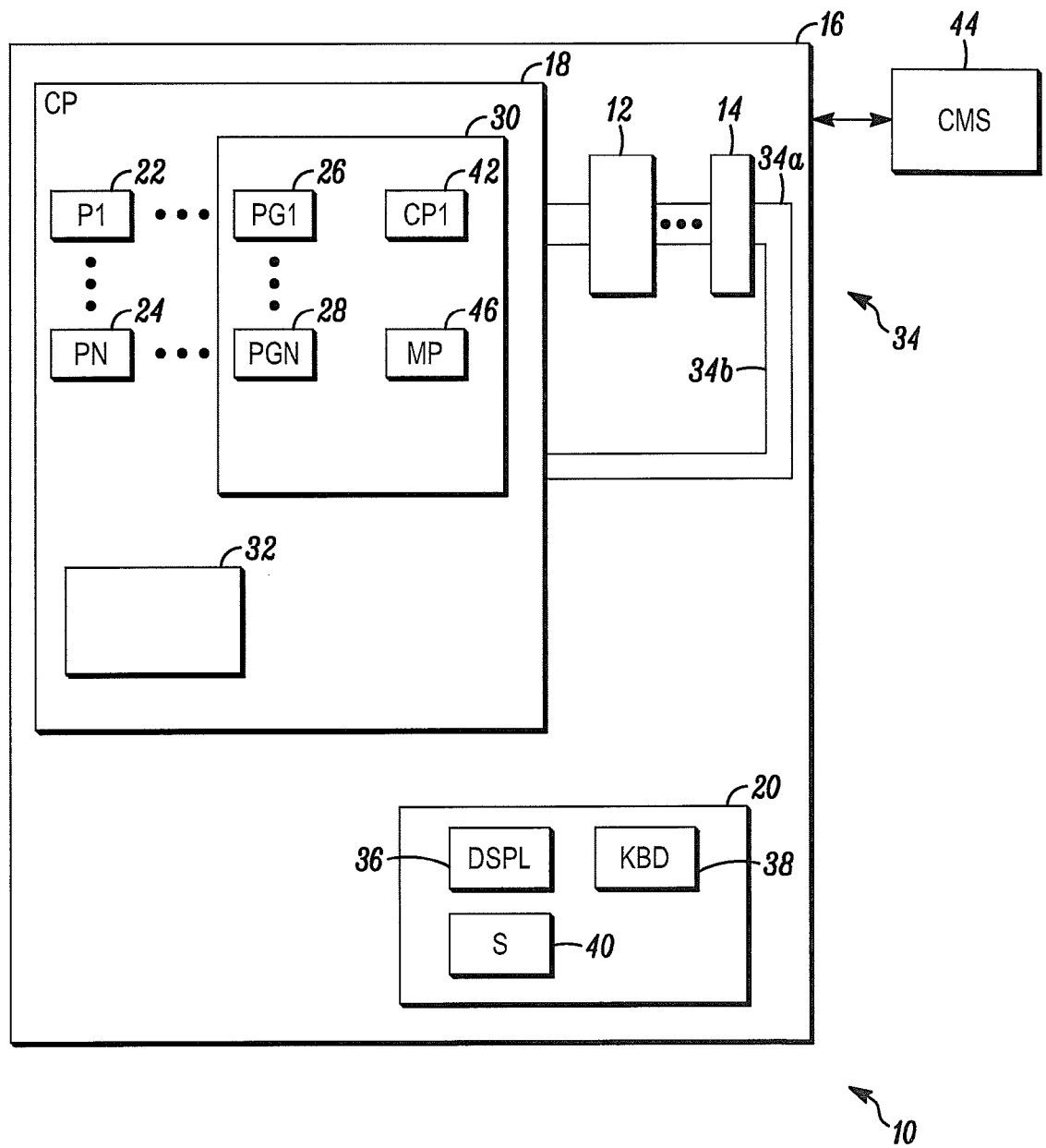

ALARM SYSTEM WITH WIRELESS COMMUNICATION

FIELD

The application pertains to alarm systems and, more particularly, to fire alarm systems in preexisting buildings that are connected via a wired network.

BACKGROUND

Systems are known to detect fires. Such systems typically include a number of fire detectors and pull stations distributed throughout a secured area (e.g., a building).

Each of the fire detectors and pull stations (devices) is typically connected to a local fire alarm panel. Upon detection of a fire, an audible and/or visual alarm connected to the panel may be activated to warn occupants of the secured area of the possibility of a fire. The alarm panel may also send an alarm message to a central monitoring station at a remote location.

In analog addressable fire systems, the alarm devices are typically connected to the panel via one or more 2-wire loops. In this regard, each of the devices may be connected in parallel across the two wires of the 2-wire loop.

The wires of the 2-wire loop include a power conductor and a neutral conductor. The power conductor provides both power and a communications channel between the panel and each of the detectors.

Included within each of the devices are a transceiver and an associated alarm device. The transceiver is used for communicating with the panel through the power conductor. The alarm device may be a fire detector or the manually activated switch of a pull station.

In this regard, each of the alarm devices is individually addressable by the panel. During normal operation, the panel may periodically poll each alarm device for status information.

While analog addressable fire systems work well, they have a limited utility in addressing changing safety criteria. For example, in old or monumental buildings or buildings where modifications are often difficult (e.g., the presence of asbestos prevents economical modifications), it is often impossible to update such systems to meet conditions. Accordingly, a need exists for better methods of utilizing 2-wire systems.

BRIEF DESCRIPTION OF THE DRAWING

FIG. 1 illustrates a block diagram of a fire alarm system 10 in accordance herewith.

DETAILED DESCRIPTION

While disclosed embodiments can take many different forms, specific embodiments thereof are shown in the drawings and will be described herein in detail with the understanding that the present disclosure is to be considered as an exemplification of the principles thereof as well as the best mode of practicing the same, and is not intended to limit the application or claims to the specific embodiment illustrated.

FIG. 1 is a simplified block diagram of a fire alarm system 10 shown generally in accordance with an illustrated embodiment. Included within the system are a number of fire alarm devices 12, 14 that announce or report fires within a secured area 16.

The fire alarm reporting devices may include any of a number of fire detection devices and pull (or call) stations. Fire alarm detection devices used within the system may be based upon any of a number of different fire detection methodologies (e.g., smoke detection, heat detection, etc.).

Similarly, the pull stations may be devices that are manually activated by occupants of the secured area in the event of a fire. Pull stations may be located throughout the secured area in passageways or along routes of egress from the secured area.

The reporting devices may be connected to the panel via a 2-wire loop 34 including a first conductor 34a and a second conductor 34b. Each of the reporting devices connected to the loop may be independently addressable by the panel. Stated in another way, each of the alarm reporting devices has a unique address that allows the panel to poll and independently communicate with that device via a 2-way connection that is independent of any other device on the 2-wire loop.

Alternatively, the reporting devices may be wireless devices coupled to the panel via a wireless channel. In this regard, the panel and each of the reporting devices may be provided with a transceiver that automatically establishes a two-way connection between the panel and the reporting device. As with previous embodiments, each of the wireless reporting devices are independently addressable by the panel via a unique address assigned to each of the reporting devices and also to the panel.

Also located within the secured area are one or more portable cellular wireless devices (e.g., iphones, android devices, etc.) 20. The portable devices interact with the fire alarm system to report fires and to display egress information for the benefit of a user in the event of a fire.

Also located within the panel, within at least some of the alarm devices and within each of the cellular devices, are one or more processor apparatus (processors) 22, 24, each operating under control of one or more computer programs 26, 28 loaded from a non-transient computer readable medium (memory) 30. As used herein, reference to a step performed by a computer program is also reference to the processor that executed that step.

Located within the panel and/or within one or more of the alarm devices (e.g., pull station, fire detector, etc.) is a cellular transceiver 32. Where located within an alarm reporting device, the cellular transceiver may use the same unique address assigned to the reporting device in communicating with the panel or may have its own unique address.

Operating within each of the portable cellular devices are an alarm system interface program and a processor(s) that allow the cellular device to interact with the alarm system in order to report alarms and to receive evacuation information. In this regard, a portion of the interface processor or a separate alarm reporting processor operates in conjunction with a corresponding reporting processor within the panel to receive and act upon alarm notifications received from the portable device. Another portion of the interface processor or a separate notification processor within the portable cellular device operates in conjunction with a corresponding notification processor within the panel to notify the user of alarms originating from other system devices and to instruct the user on how to evacuate the secured area.

Alarms may be initiated from a cellular device either automatically via one or more sensors 40 of the cellular device or manually by a user through a user interface on the portable device. The user interface may be an interactive touch screen 36 or a display 38 and associated keyboard 38. In this regard, the reporting processor may display a fire icon on the display. The user may activate the icon to report a fire to the alarm panel.

Similarly, the sensor may be an infrared (IR) sensor, heat sensor or an existing cell phone camera that detects indications of fire. For example, a fire detection processor of the cellular device may process images from the camera to detect the blurring or haziness of images caused by smoke in the area of the user.

In general, the cellular transceiver of the panel or reporting device(s) is programmed to only communicate with cellular devices registered with the alarm system. For example, a hotel using the alarm system may register the cell phones of each of its guests within a respective file 42 of the alarm system.

The panel may include one or more wireless WiFi transceivers operating as a base station under IEEE 802.11. For example, the WiFi transceivers may be located within one or more of the reporting devices. In this case, the alarm panel may register the cellular device and determine its location based upon the WiFi transceiver that detects the cellular device.

Alternatively, the security system may include a location detection system, such as WiFi or Bluetooth, etc., which can provide location information of the cell phone. In this case, the alarm panel may register the cellular device and process its alarm only if its location is determined to be within the building by the location system.

In the case of reported alarms, the panel may receive and act upon a fire alarm based upon the pull station or other reporting device through which the alarm was reported. In response, an alarm processor of the panel may activate local audible and/or visual devices throughout the secured area. The alarm processor may also send an alarm message to a central monitoring station 44. The central monitoring station may respond by notifying a local fire department.

In addition to activating a general alarm, the notification processor within the panel may send an alarm message and evacuation instructions to a user of the cellphone based upon the determined location of the cellphone. The instructions may be in the form of verbal instructions or may be in the form of a map downloaded to the cellphone and shown on the display of the cellphone.

Alternatively, the panel may simply send an alarm message (and nothing more) to the cell phone. The application executing on the cell phone may have a preloaded evacuation plan or the cell phone may independently download the evacuation plan from an appropriate server or from the cloud.

The memory of the panel may contain one or more files including maps 46 of the secured area along with the coordinates of each alarm reporting device. When the panel receives an alarm notification from a cellphone through one of the alarm reporting stations, a locating processor may determine the location of the reporting station (and cellphone) and download an evacuation map corresponding to that location to the cellphone. A corresponding notification processor of the panel may download a respective evacuation map to every other cellphone registered with the alarm panel based upon the reporting station through which those other cellphones are registered.

In another embodiment, the cell phone application itself can have a program to determine its own location in the building and find a safe and shortest path to the nearest exit. Accordingly, it can provide its own directions and verbal instructions to the user in order to guide the user to the exit. In this case, the panel can provide information regarding which area of the building is on fire so that the cellphone application can provide information to avoid that area while finding the path to the nearest exit.

Similarly or alternatively, the file may include an audio file corresponding to each reporting station. In this case, the audio file may include respective audio instructions for evacuating the secured area from the location of each reporting station. Upon determining the location of a fire, the notification processor may download audio instructions to each cellphone based upon the reporting station through which the cellphone is registered.

In general, the system includes a fire panel with one or more stationary cellular radio modems. In many existing systems, a fire panel may not be installed in areas of good cell phone coverage. To ensure reach of the cellular network to the fire system, a few or all of the reporting stations may be provided with a cellular modem. It can be ensured during deployment that at least a few of those reporting stations provide good cellular coverage in the secured area.

Where the system is installed in a residential setting, the cellular phone numbers of resident users are registered in the fire panel and, possibly, one or more of the call points. This is done in a secure way using cell phone based tools and cellular communication implemented by a building security organization.

The cellphones incorporate a simple user application (mimicking a call point or asking the user for simple button clicks) installed on the user mobile device. Alternatively, a user may interact with the application using a voice interface with the application.

The user registration process can also be made part of the user application where the application automatically connects with associated fire systems and registers itself as one of the installation steps.

The built-in temperature detector(s) of cellphones and/or smart phones are used by the application to monitor the temperature and to generate alarm messages if a pre-defined threshold is crossed.

Alternatively, the camera on the cellphone can be used to detect smoke or fire. The effectiveness of this detection technique may depend on cell phone orientation, visibility conditions and proximity. Alternatively, IR devices embedded in some phones can be used for heat detection.

The alarm message received through any cellular modem embedded in the reporting stations is forwarded by the call point electronics as a fire alarm with an address of the reporting device. The address can also be derived from the cell phone number or can be a separate number assigned to each user (e.g., based upon a hotel room rented by the user).

The alarm panel of the system may poll the SLC address of reporting stations registered as remote call points. In this case, any call point proxying for a cell phone device and receiving the alarm will be able to inform the panel of the alarm.

As an alternative, the call point receiving an alarm message from a cellphone (i.e., the alarm reporting device) generates an alarm at its own address. The panel is able to poll the cell phone number from the call point using SLC communication.

In non-addressable systems, the call point receiving an alarm message from a cellphone generates an alarm. User identification may not be possible in this case.

If the panel receives the alarm directly through its cellular modem, it will process it as any call point alarm and activate sounders or strobes and also alert a local fire department as previously configured through the central monitoring station.

The panel will send a confirmation to a cellphone user to acknowledge receipt of its alarm message. The fire panel will also send a fire alarm message to all registered cellphone users of the building as per the programmed zones or detected zones.

Upon receipt of the fire alarm message, the application on the cellphone will invoke an audio-visual as well as a vibrating alert distinct from regular phone call alerts. Additional information such as exit pathways, etc. can also be displayed to the user based on the current or registered location. The vibrating alerts help people with disabilities.

With the accurate location detection system described above, the cellphone based application guides the user along a path to an exit. The interface can be based upon a vibration pattern so that a disabled person can be guided, or could be voice and map (visual) based.

The cellphone numbers can also be assigned to a specific zone based on the respective user's residing/operating location (such as office space, hotel room, apartment) in the building. Upon receiving an alarm from a given cellphone number, the evacuation message can be sent to devices in the respective zones based upon the locations.

To further enhance the operation considering user mobility and to reduce malicious false alarms, the cellphone user can be automatically located using cell phone signal tracking or wireless triangulation with built-in WiFi or other location detection means supported by the cell phone.

In one preferred embodiment, the system includes a fire alarm system within a secured area, a call station of the fire alarm system, and a cellphone that includes at least one fire detection device and that forms a cellular connection with the fire alarm system, wherein the fire alarm system or cellphone determines a location of the cellphone, and wherein the fire alarm system detects a fire within the secured area and provides instructions through the cellphone for exiting the secured area based upon the detected location of the cellphone.

In other embodiments, the system includes a fire alarm system within a secured area, a plurality of reporting stations of the fire alarm system, and a cellphone that includes at least one fire detection device and that forms a cellular connection with one of the plurality of reporting station of the fire alarm system, wherein the fire alarm system determines a location of the cellphone, and wherein the fire alarm system detects a fire within the secured area and provides instructions through the cellphone for exiting the secured area based upon the detected location of the cellphone.

In still other embodiments, the system includes a control panel of a fire alarm system within a secured area, a plurality of reporting stations of the fire alarm system, a 2-wire loop connecting at least some of the plurality of reporting stations to the control panel, and a cellphone that includes at least one fire detection device and that forms a cellular connection with one of the plurality of reporting station of the fire alarm system, wherein the fire alarm system determines a location of the cellphone, and wherein the fire alarm system detects a fire within the secured area and provides instructions through the cellphone for exiting the secured area based upon the detected location of the cellphone.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown, or sequential order, to achieve desirable results. Other steps may be provided, or steps may be eliminated, from the described flows, and other components may be added to, or removed from, the described embodiments.

The invention claimed is:

1. A system comprising:
a fire alarm system within a secured area;
a manually activated call station of the fire alarm system; and
a cellphone that forms a cellular connection with the fire alarm system through the call station of the fire alarm system,
wherein the cellphone generates a fire alarm based upon user input or built-in sensors and sends the fire alarm through the cellular connection with the call station to the fire alarm system,
wherein the fire alarm system determines a location of the cellphone, and
wherein the fire alarm system detects a fire within the secured area based upon the fire alarm from the cellphone, issues an alarm notification through the cellphone and provides instructions through the cellphone for exiting the secured area based upon the determined location of the cellphone.

2. The system as in claim 1 further comprising a cellular transceiver within the call station or a smoke detector.

3. The system as claimed in claim 2 further comprising a processor of the cellular transceiver that determines the location of the cellphone via any location detection technique including triangulation, iBeacon, near field communication (NFC), accelerometer and acoustic sensor.

4. The system as claimed in claim 1 further comprising a processor that confirms that the cellphone is authorized to register with the fire alarm system and wherein only authorized users are allowed to generate alarms and all authorized users are provided fire alerts and navigation guidance.

5. The system as claimed in claim 1 further comprising a processor of the fire alarm system that receives an audible alarm notification through a user interface of the cellphone.

6. The system as claimed in claim 1 further comprising a 2-wire loop coupling the call station to the fire alarm system.

7. The system as claimed in claim 1 further comprising a wireless network coupling the call station to the fire alarm system.

8. The system as claimed in claim 1 wherein the built-in sensors include a camera of the cellphone and a fire detection processor that processes images from the camera to detect smoke or the fire.

9. The system as in claim 1 further comprising a call point user interface of the cellphone that allows a user to indicate the fire.

10. A system comprising:
a fire alarm system within a secured area;
a plurality of reporting stations of the fire alarm system located throughout the secured area; and
a cellphone that includes at least one fire detection device and that forms a cellular connection with the fire alarm system through a local one of the plurality of reporting stations of the fire alarm system,
wherein the cellphone generates a fire alarm based upon user input or the fire detection device and sends the fire alarm through the cellular connection with the fire alarm system through the local one of the plurality of reporting stations to the fire alarm system,
wherein the fire alarm system determines a location of the cellphone,
wherein the fire alarm system detects a fire within the secured area based upon the fire alarm from the cellphone, issues an alarm notification through the cellphone, and provides instructions through the cellphone for exiting the secured area based upon the determined location of the cellphone, and wherein a user's location information is used to avoid false or hoax alarms and for zoning.

11. The system as claimed in claim 10 further comprising a plurality of evacuation maps within a memory, a server, or a cloud server, wherein each of the plurality of evacuation maps corresponds to one of the plurality of reporting stations.

12. The system as claimed in claim 11 further comprising a processor of the cellphone or a panel of the fire alarm system that downloads one of the plurality of evacuation maps to the cellphone based upon the determined location of the cellphone.

13. The system as claimed in claim 10 further comprising a plurality of audio files within a memory of the cellphone or a panel of the fire alarm system, wherein each of the plurality of audio files corresponds to one of the plurality of reporting stations, and wherein the panel of the fire alarm system provides information about fire spread so that the cellphone avoids a fire area while finding a nearest exit.

14. The system as claimed in claim 13 further comprising a processor that downloads one of the plurality of audio files to the cellphone based upon the determined location of the cellphone.

15. The system as claimed in claim 10 further comprising a 2-wire loop or wireless network that connects at least some of the plurality of reporting stations to a control panel of the fire alarm system.

16. The system as in claim 10 further comprising a cellular transceiver within at least some of the plurality of reporting stations.

17. The system as claimed in claim 10 wherein the sensor fire detection device further includes an infrared sensor and a program to detect the fire using the infrared sensor or a camera.

18. A system comprising:

a control panel of a fire alarm system within a secured area;

a plurality of reporting stations of the fire alarm system located throughout the secured area;

a 2-wire loop connecting at least some of the plurality of reporting stations to the control panel; and a cellphone that includes at least one fire detection device and that forms a cellular connection with the fire alarm system through a local one of the plurality of reporting stations of the fire alarm system, wherein the cellphone generates a fire alarm based upon user input or the fire detection device and sends the fire alarm through the cellular connection with the fire alarm system through the local one of the plurality of reporting stations to the fire alarm system, wherein the fire alarm system determines a location of the cellphone based upon the cellular connection, and wherein the fire alarm system detects a fire within the secured area based upon the fire alarm from the cellphone, issues an alarm notification through the cellphone, and provides instructions through the cellphone for exiting the secured area based upon the determined location of the cellphone.

19. The system as claimed in claim 18 further comprising a cellular transceiver in at least some of the plurality of reporting stations.

* * * * *